(12) United States Patent
Dewald et al.

(10) Patent No.: US 6,788,469 B2
(45) Date of Patent: Sep. 7, 2004

(54) AUTOMATED LAMP FOCUS

(75) Inventors: Duane Scott Dewald, Dallas, TX (US); William B. Werner, Plano, TX (US); Frank J. Poradish, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/039,127

(22) Filed: Dec. 31, 2001

(65) Prior Publication Data

US 2002/0085288 A1 Jul. 4, 2002

Related U.S. Application Data

(60) Provisional application No. 60/259,378, filed on Dec. 30, 2000.

(51) Int. Cl.[7] ............................ G02B 27/14; G03B 21/00
(52) U.S. Cl. ........................... 359/634; 359/638; 353/33
(58) Field of Search ................................. 359/626, 618, 359/634; 356/123, 425; 362/268; 353/33, 99

(56) References Cited

U.S. PATENT DOCUMENTS

| | | | | |
|---|---|---|---|---|
| 4,598,197 A | * | 7/1986 | Morita et al. ............... 250/205 |
| 5,241,188 A | * | 8/1993 | Mizutani ..................... 250/548 |
| 5,488,230 A | * | 1/1996 | Mizutani et al. ............. 250/548 |
| 5,626,409 A | * | 5/1997 | Nakayama et al. ........... 353/31 |
| 6,299,310 B1 | * | 10/2001 | Reis ............................ 351/214 |
| 6,309,073 B1 | * | 10/2001 | Nakayama et al. ........... 353/38 |

* cited by examiner

Primary Examiner—Ricky Mack
(74) Attorney, Agent, or Firm—Charles A. Brill; Wade James Brady, III; Frederick J. Telecky, Jr.

(57) ABSTRACT

Methods for measuring and automatically controlling the light distribution and overall brightness in electronic-based spatial light modulator projection display systems. One method takes a small fraction of the projected light from a partial turning mirror 407 in the projector's optics path and focuses this light on to a detector 420 for use in controlling the light distribution and brightness of the system. Another method uses an array of embedded light sensors 518–522 at chosen locations on the surface of a display screen 517 to control the light distribution and brightness parameters of the projection system. Both methods use a micro-controller, servomotors, and an adjustable power supply, controlled by the detector/sensor outputs, to maintain the desired light distribution and brightness in the projected image.

22 Claims, 4 Drawing Sheets

AUTOMATED LAMP FOCUS

This application claims priority under 35 USC §119(e)(1) of provisional application number 60/259,378 filed Dec. 30, 2000.

FIELD OF THE INVENTION

The present invention relates to projection display systems and particularly to controlling the lamp focus and brightness in such systems.

BACKGROUND OF THE INVENTION

The lamp used in projection display systems requires periodic adjustment for optimum light distribution on the display screen and for maximum overall brightness of the projected image. This adjustment is normally carried out by skilled technicians, and as a result has often been neglected resulting in projectors being operated with less than optimal performance. This is particularly true in the case of modern spatial light modulator projection systems, where the lower f/# of the optics makes the sensitivity to lamp focus even greater.

Some spatial light modulator projection systems have addressed the lamp focus issue by placing a detector near the stop of the optical system's relay lens to measure the overall system brightness and then adjusting the brightness based on this data. However, this approach completely ignores the brightness distribution issues that are so critical in such systems.

What is needed is a method that collects data for both the light distribution and brightness level in a projection system and uses this data to automatically adjust the lamp brightness and position for optimal projection performance.

SUMMARY OF THE INVENTION

This present invention discloses methods and structures for providing automated lamp focus and brightness control in spatial light modulator (SLM) based projection display systems.

One embodiment discloses a method of sampling the light output and distribution of the projector without having to measure the screen surface. These systems typically use relay optics to focus light from an integrator on to the focal plane of spatial light modulators. The relay optical system is folded using mirrors to maintain co-linearity between the light input and output. In the present invention, one of these folding mirrors is used as a sampling filter, where a small fraction of the light that strikes the surface of the partial mirror passes through it. A separate lens is then used to focus this faint image, which is identical to the primary projection image except for brightness, on to a detector. The brightness level of this sampled image is then correlated with the overall system brightness. The output of the detector is connected to a micro-controller, which is used to determine the light distribution at selected points in the image and the brightness of the image. The output of the micro-controller then drives control hardware for positioning (focusing) the lamp and adjusting the brightness of the image.

Another embodiment discloses a method by which an array of light sensors are embedded in perforations in the surface of a display screen to provide input data to a micro-controller, which is used to determine the light distribution and brightness of the system and to drive lamp position (focus) and brightness control hardware. In this case the sensors are spatially located at selected points on the surface of the screen to directly detect the light hitting the display screen.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

The present invention provides an automated lamp focus and brightness control in electronic-based spatial light modulator (SLM) projection display systems. The methods of this invention provide capability to maintain a desired light distribution and to keep a projector at maximum brightness during system warm-up, where the lamp requires continuous adjustment due to expansion of the lamp envelope, to maintain optimum performance, thereby eliminating the need to turn the projector on for an extended warm-up period before using it in an application. It also keeps the projector at maximum brightness as the lamp ages, and provides information to maintenance personnel when the lamp is out of specification and needs replacing. The methods further allow for lamp performance data to be transmitted to a facility center for monitoring, with maintenance personnel being dispatched only when the lamp needs replacing or major manual adjustment.

Figure 1:
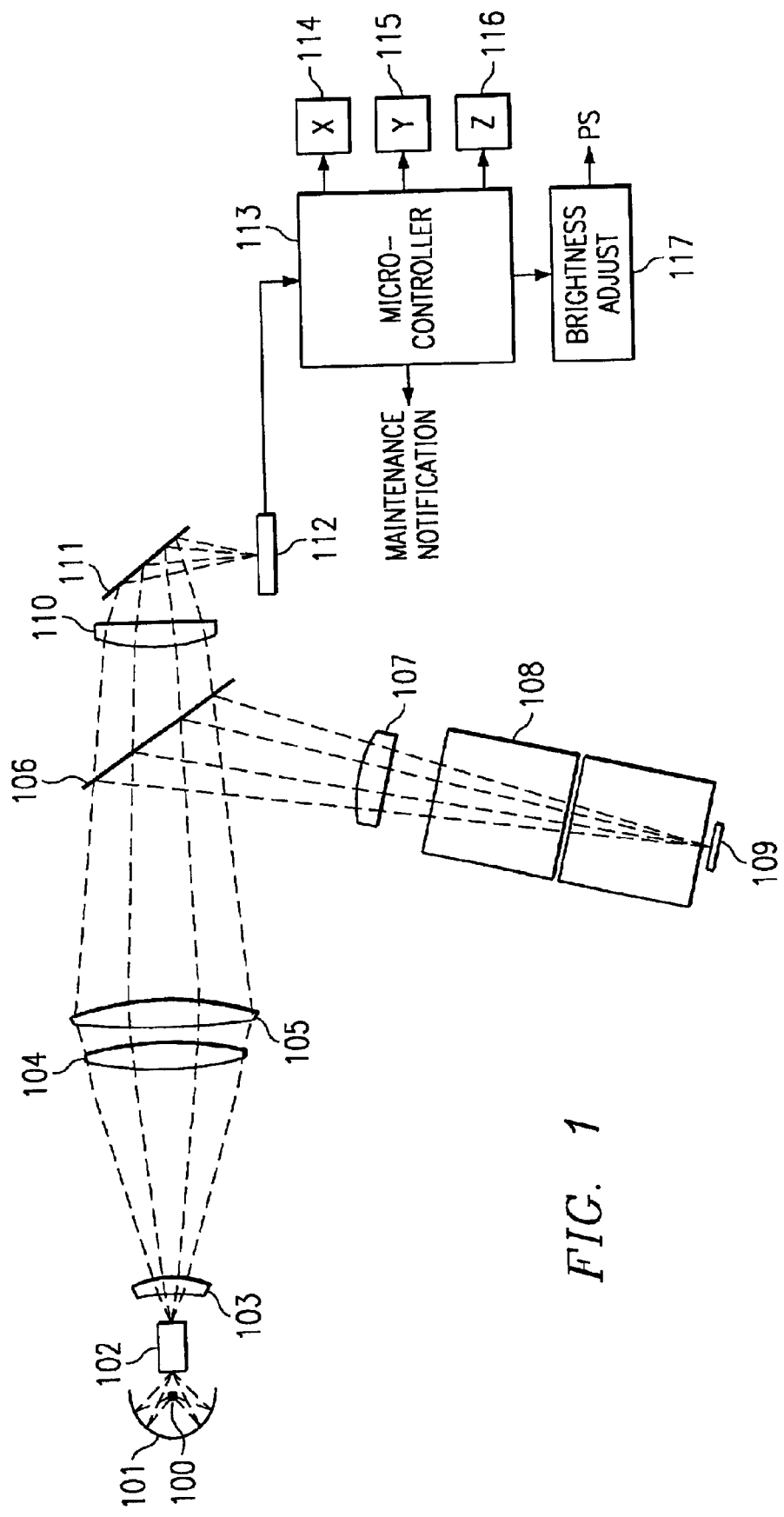
FIG. 1 is a block diagram of the optical sub-system used in a first embodiment of the present invention, which directs a small fraction of the projected light on to the surface of a detector and uses this information to automatically adjust the light distribution and overall brightness of a projection system.

FIG. 1 is a block diagram of the optical sub-assembly used in the first embodiment of the present invention, which involves sampling the light distribution and brightness without having to measure the screen surface. This method directs a small fraction of the projected light on to the surface of a detector and uses this information to automatically adjust the light distribution and overall brightness of a projection system. In this optics, a light source consisting of a lamp 100 and reflector 101 (shown as an elliptical reflector) focuses a spot of white light on to the input surface of a light integrator 102. Light from the integrator 102 is passed through a first relay lens 103 and through a second series of relay lenses 104/105 on to the surface of a partial turning mirror 106. The majority of this light (primary light) is reflected off the turning mirror 106 through a third relay lens 107 and into splitting and recombining prisms 108. SLMs 109 are positioned to receive red, green, and blue light from the respective prisms (only one channel shown). This red, green, and blue light is modulated by the SLMs and reflected back into the recombining prisms and then through a projection lens (not shown) and on to a display screen (not shown).

A small fraction (typically less than 1%) of the light striking the surface of the partial turning mirror 106 passes through the turning mirror 106 where it is focused by lens 110 and reflected by a secondary turning mirror 111 on to the surface of a detector 112. This focused image at detector 112 provides a light distribution representation that is identical to the light distribution across the system's display screen and the brightness of this faint image can be correlated to the overall screen brightness.

The output of detector 112 is connected to the input of a micro-controller 113, which (1) controls x, y, and z focus servomotors 114–116, (2) controls a brightness level adjustable power supply 117, and (3) provides a maintenance notification signal to alert personnel when the lamp 101 needs to be manually adjusted or replaced.

Figure 2:
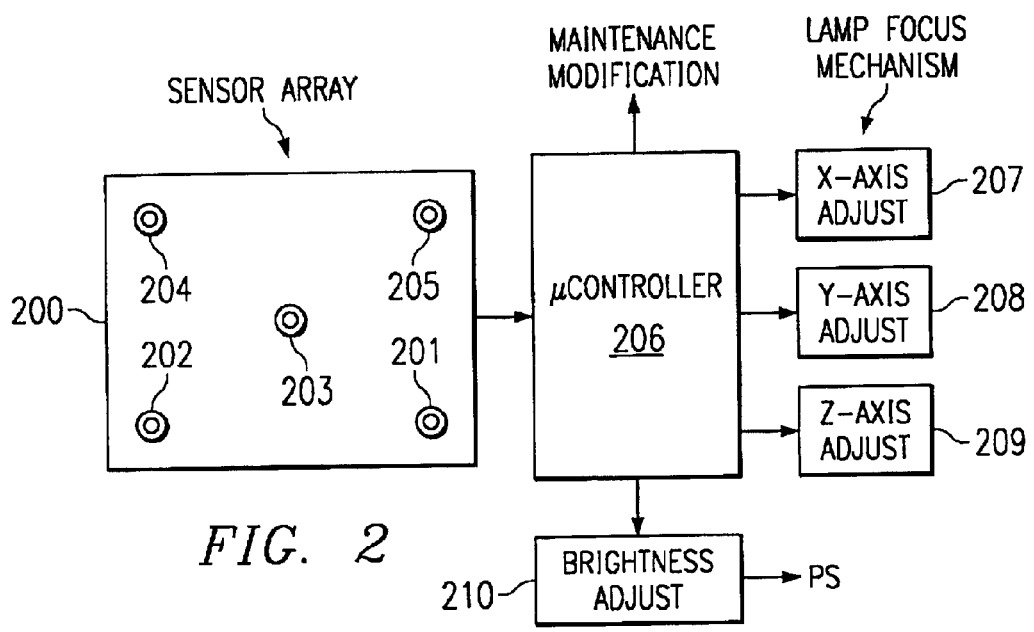
FIG. 2 is a block diagram of the optical sub-system used in a second embodiment of the present invention, which places an array of light sensors embedded at selected locations in the surface of the display screen and uses the information from these sensors to automatically adjust the light distribution and overall brightness of a projection system.

FIG. 2 is a block diagram of the sub-assembly used in the second embodiment of the present invention, which has an array of light sensors (photoelectric cells) 201–205 embedded in the surface of the display screen at selected locations and uses the information from these sensors to automatically adjust the light distribution and overall brightness of a projection system. This approach is used with optics typical of that along the primary light path of the first embodiment discussed above, but has sensors 201–205 embedded in the surface of the display screen 200 rather than the detector 112 internal to the optics. In this case, the multiple sensors 201–205 are spatially located at selected locations across the surface of the screen so that direct light distribution data is taken and actual screen brightness is measured. The outputs of the sensors 201–205 are connected to a micro-controller 206, which (1) controls x, y, and z focus servomotors 207–209, (2) controls a brightness level adjustable power supply 210, and (3) provides a maintenance notification signal to alert personnel when the lamp needs to be manually adjusted or replaced.

Figure 3:
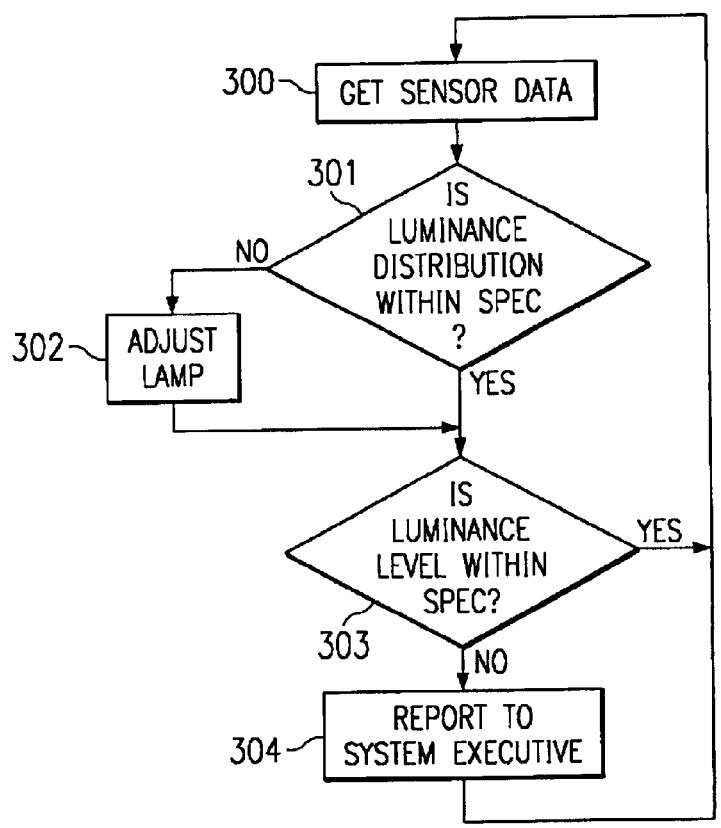
FIG. 3 is a flowchart showing the sequential operation for providing uniform light distribution and maximum brightness using the automated methods of the present invention.

FIG. 3 is a flowchart showing the sequential operation for providing uniform light distribution and maximum brightness control using the automated lamp focus methods of the present invention. In both embodiments of the invention, the micro-controller 113/206 retrieves data 300 from the detector 112/sensors 201–205 and determines if the luminance distribution is within specification 301. If not, then signals are sent to the x 114/207, y 115/208, z 116/209 servomotors to reposition and properly focus the lamp. If the lamp is within specification or after it has been refocused, then the overall luminance data is checked to determine if it is within specifications. If not, then a report is sent to the system executive so that the brightness can be adjusted, either automatically or by a technician, or the lamp can be replaced if necessary. Finally, if the luminance is within specification or after it is adjusted to specification, a new set of data is retrieved from the detector/sensors and the cycle repeats.

Figure 4:
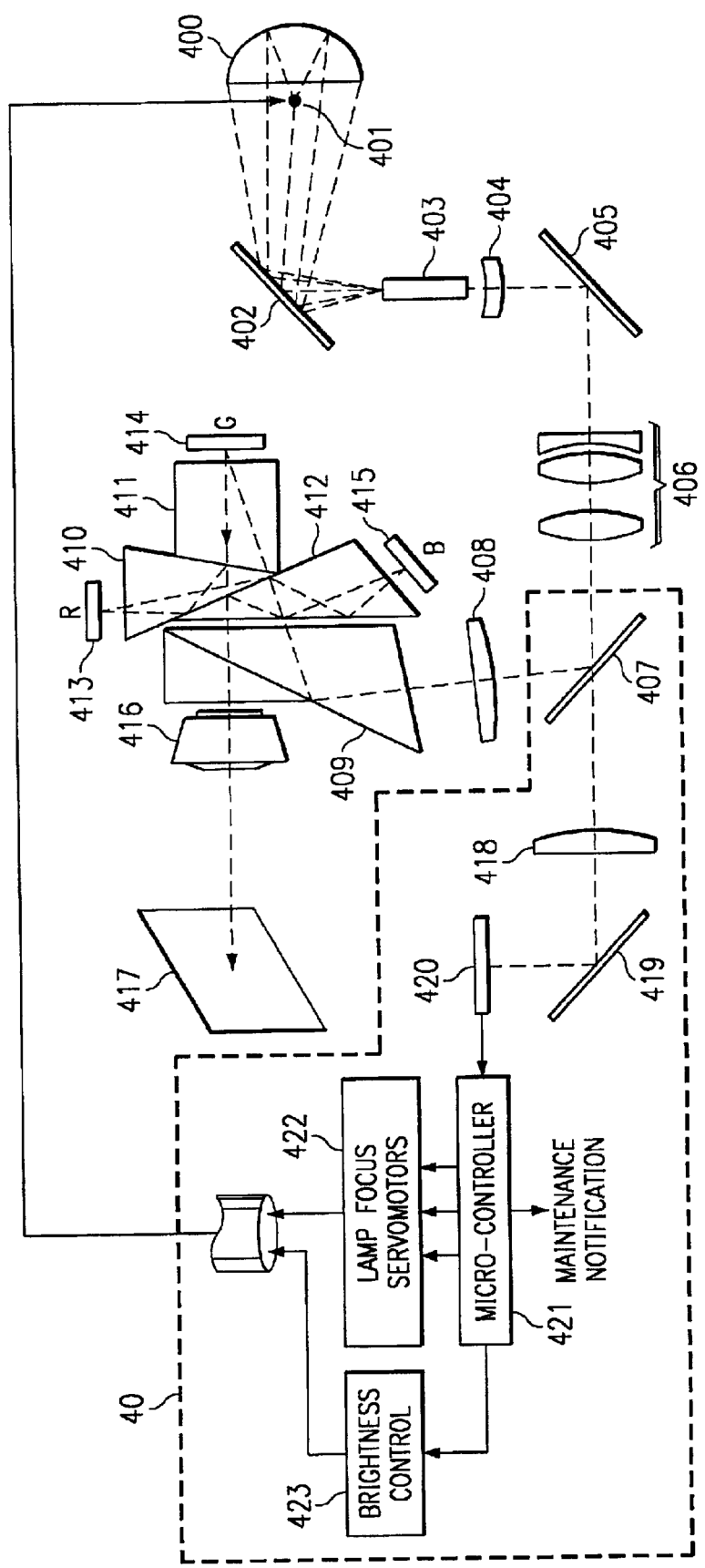
FIG. 4 is a block diagram of a spatial light modulator projection display, which uses the approach of the first embodiment of the present invention, where a small fraction of the projected light is focused on to a detector and used to control automated light distribution and brightness adjustment in a projection system.

FIG. 4 is a block diagram of a spatial light modulator projection display, which uses the approach of the first embodiment of the present invention, where a small fraction of the projected light is focused on to a detector and used to control the automated light distribution and brightness adjustments in a projection system.

In operation, a reflector 400 gathers white light from a lamp 401 and directs the light along a first light path, bringing the light to focus at the input surface of an integrator 403. The light is shown being folded through a folding mirror 402 in order to keep the optical package small, although this mirror is optional. Light out of the integrator 403 is directed through a first relay lens 404 and second series of relay lenses 406 on to the surface of a partial turning mirror 407, which reflects the majority of light along a second light path to the spatial light modulators and passes a small fraction of light (less than 1%) along a third light path to a detector for use in controlling the lamp distribution and brightness. A second optional folding mirror 405 is shown, again for packaging purposes. Light along the second path goes through a third relay lens 408, through a total internal reflective prism 409, into color (red, green, and blue) color splitting/recombining prisms 410–412. Red, green, and blue light is then directed on to the surface of three spatial light modulators 413–415, where it is modulated depending on the binary state of the modulator pixels and reflected back through the color recombining prisms 410–412, through a projection lens 416, and on to a display screen 417.

Significant to this first embodiment of the invention is the light coming through the partial turning mirror 407, along the third light path, which is focused by lens 418 and passed on to the surface of a detector 420. Once again, an optional folding mirror 419 is shown for packaging purposes.

This small fraction of focused light directed to the detector 420 is taken from the primary light beam and, as a result exhibits an identical light distribution as the light projected on to the display screen. Also, the brightness of this light can be directly correlated to the overall screen brightness. As a result, data from the detector 420 can be used to automatically adjust the light distribution, or to either automatically or manually adjust the screen brightness, and to provide notification to personnel that the lamp needs to be replaced.

The output of detector 420 is coupled to a micro-controller 421 that is used to determine what adjustments are necessary. First, second, and third micro-controller outputs drive x, y, z servomotors 422 for positioning the lamp 401 and keeping it focused to provide the desired light distribution. A fourth micro-controller output drives the lamp brightness control 423 to adjust the lamp power supply for the desired brightness level. The micro-controller 421 also provides a maintenance notification signal to system personnel to indicate when the lamp 401 needs changing or when some other light function maintenance is required.

Another configuration of the first embodiment of the invention is also shown in FIG. 4, where the automatic lamp focus and brightness hardware is packaged as a retrofit kit for existing projectors. The separate optional attachment 40 is comprised of a replacement partial turning mirror 407, a focus lens 418, a turning mirror 419, and a detector 420, along with a micro-controller 421, focus servomotors 422, and brightness control 423 hardware.

Figure 5:
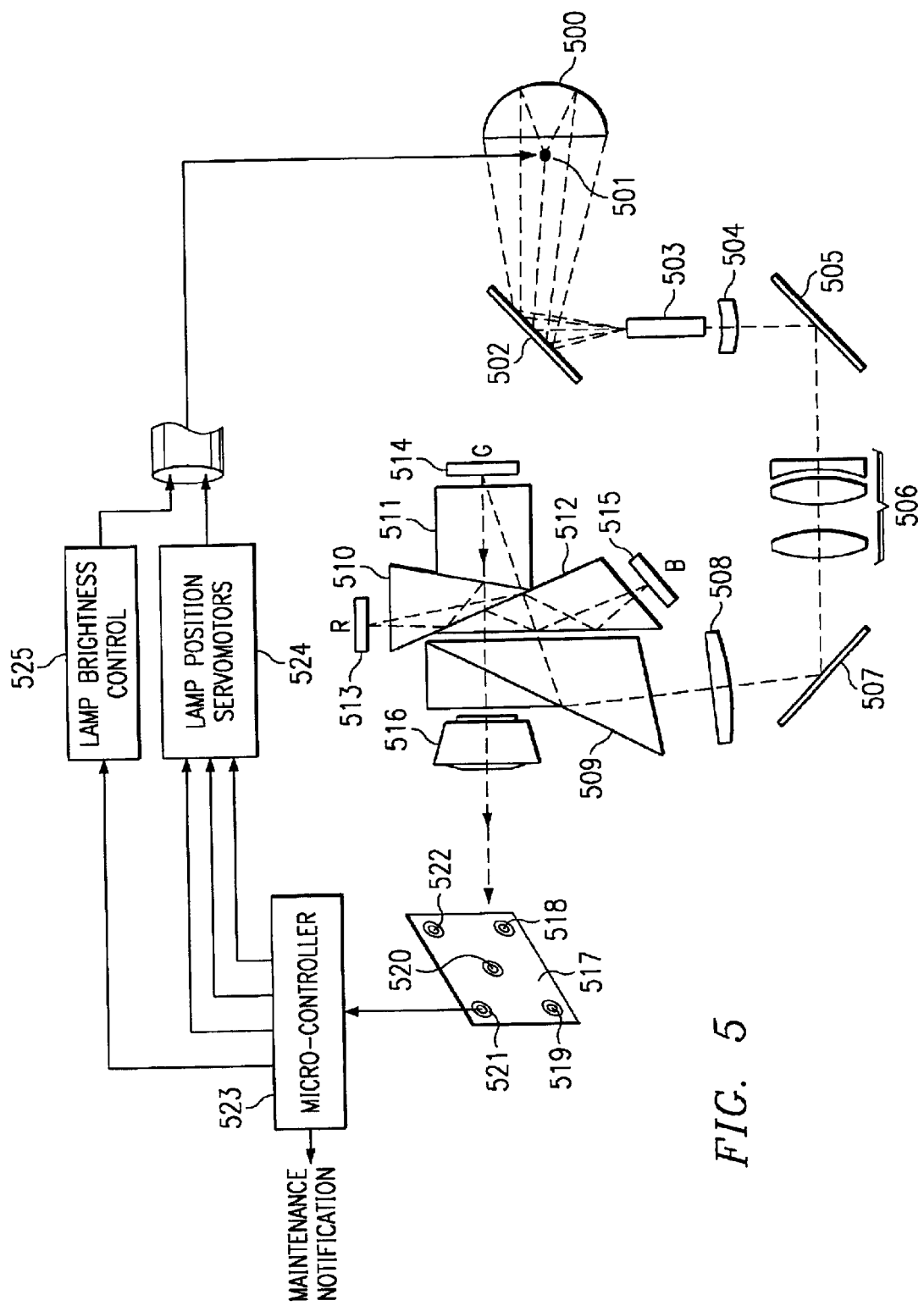
FIG. 5 is a block diagram of a spatial light modulator projection display, which uses the approach of the second embodiment of the present invention, where an array of light sensors are embedded at selected locations in the surface of the display screen and used to automatically control the adjustment of the light distribution and overall brightness in a projection system.

FIG. 5 is a block diagram of a spatial light modulator projection display, which uses the approach of the second embodiment of the present invention, where an array of light sensors 518–522 are embedded at selected locations in the surface of the display screen and used to automatically control the adjustment of the light distribution and overall brightness in a projection system.

In operation, a reflector 500 gathers white light from a lamp 501 and directs the light along a first light path, bringing the light to focus at the input surface of an integrator 503. The light is shown being folded through a folding mirror 502 in order to keep the optical package small, although this mirror is optional. Light out of the integrator 503 is directed through a first relay lens 504, a second series of relay lenses 506, on to the surface of a turning mirror 507, along a second light path. Light along the second path goes through a third relay lens 508, through a total internal reflective prism 509, into color (red, green, and blue) splitting/recombining prisms 510–512. Red, green, and blue light is then directed on to the surface of three spatial light modulators 513–515, where it is modulated depending on the binary state of the modulator pixels and reflected back through the color recombining prisms 510–512, through a projection lens 516, and on to a display screen 517.

Significant to this second embodiment of the invention is the display screen 517, which has an array of sensors 518–522 embedded in perforations at selected locations in its surface. These sensors provide a direct readout of the light distribution and screen brightness, which is used to automatically adjust the light distribution, to either automatically or manually adjust the screen brightness, and to provide notification to personnel that the lamp needs to be replaced.

The outputs of the array of sensors 518–522 are coupled to a micro-controller 523 that is used to determine what adjustments are necessary. First, second, and third micro-controller outputs drive x, y, z servomotors 524 for positioning the lamp 501 and keeping it focused to provide the desired light distribution. A fourth micro-controller output drives the lamp brightness control 525 to adjust the lamp power supply for the desired brightness level. The micro-controller 523 also provides a maintenance notification signal to the system personnel to indicate when the lamp 501 needs changing or when some other light function needs manual attention.

While the present invention has been described in the context of preferred embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. An optics/controller sub-assembly for automated focus and brightness control in a spatial light modulator projection system, comprising:
   a lamp/reflector providing white light along a first light path, said light brought to a focus point at the entrance to a light integrator;
   a first relay lens receiving light from said light integrator and sizing said light to the entrance of a second group of relay lenses;
   light from said relay lenses continuing along said first light path, striking the surface of a partial folding mirror;
   primary light reflecting off said partial folding mirror along a second light path and partial light passing through said partial folding mm-or exiting along a third light path;
   a third relay lens placed in said second light path, receiving said reflected primary light from said partial folding mirror and resizing said light to match said system's total internal reflective prism;
   light passing through said total internal reflective prism to red-green-blue splitting prisms;
   spatial light modulators positioned to receive said red-green-blue light, respectively, from said color prisms, said light being modulated and reflected from said respective spatial light modulators into recombining optics, through a projection lens, and on to a display screen;
   a third relay lens located in said third light path, receiving said partial light passing trough said partial folding mirror, sizing, and directing said light on to the surface of secondary folding mirror;
   a light detector receiving said reflected light from said secondary folding minor, a micro-controller coupled to the output of said detector;
   first, second, and third outputs from said micro-controller coupled to lamp x, y, z focus servomotors, respectively;
   a fourth output from said micro-controller coupled to a lamp power supply; and
   a fifth output from said micro-controller to enable a maintenance notification function.

2. The optics/controller sub-assembly of claim 1 wherein said partial folding mirror performs a sampling filter function on light along said first light path, allowing less than 1% of said light to pass through said folding mirror.

3. The optics/controller sub-assembly of claim 2 wherein said light along third light path is focused to form an image, having less light than said projected display image, on the surface of said detector.

4. The optics/controller sub-assembly of claim 3 wherein said light focused on said detector has the same light distribution as said projected light focused on said display screen.

5. The optics/controller sub-assembly of claim 3, wherein the brightness of said light focused on said detector correlates with the overall brightness of said projected light focused on said display screen.

6. The optics/controller sub-assembly of claim 1, wherein said servomotors adjust the lamp position to maintain optimum real-time light distribution in said projection system.

7. The optics/controller of claim 1, wherein said lamp power supply is adjusted to maintain maximum brightness level during warm-up of said projection system.

8. The optics/controller of claim 1, wherein said maintenance notification alerts personnel to service said projection system, replacing said lamp if necessary.

9. An automated lamp focus method for spatial light modulator based projection systems, comprising the steps of:
   focusing an image, using a portion of the system's projected light, on to a detector located in said system's optics chain;
   obtaining sensor data at the input of a micro-controller; and
   calculating the lamp luminance distribution and providing input signals from said micro-controller to x, y, and z servomotors to adjust the lamp focus.

10. The method of claim 9, wherein said servomotor adjusts said lamp position to maintain optimum real-time light distribution in said projection system.

11. The method of claim 9, wherein said lamp power supply is adjusted to maintain a uniform brightness level during warm-up of said projection system.

12. A spatial light modulator based electronic projection system with automated lamp focus control, comprising:

a light source emitting light along a first light path;

a light integrator on said first light path receiving said light;

a first relay lens directing light from said integrator to a second series of relay lenses and on to the surface of a partial turning mirror;

primary light reflected from said partial turning mirror directed along a second light path through a third relay lens and through a total internal reflective prism on to the surface of red-green-blue color splitting prisms, respectively;

three spatial light modulators positioned to receive red-green-blue light, respectively, from said color prisms;

modulated light reflected from said spatial light modulators directed through recombining optics and projected by means of a projection lens, on to a display screen;

secondary light passing through said partial turning minor directed along a third light path, through a focusing lens and reflecting off a secondary turning mirror onto the surface of a light detector, a micro-controller coupled to the output of said light detector, wherein the output of said light detector is used to control the brightness and light distribution of said light source.

13. The apparatus of claim 12, further comprising:

first, second, and third outputs from said lamp focus mechanism driving respective x, y, and z servomotors for precisely positioning said lamp;

a fourth output from said lamp brightness control circuitry driving a lamp power supply for adjusting said lamp's brightness; and a fifth output of said micro-controller providing a maintenance notification signal.

14. The apparatus of claim 13, wherein said servomotors are used to adjust said lamp position to maintain optimum real-time light distribution in said projection system.

15. The apparatus of claim 13, wherein said lamp power supply is adjusted to maintain a uniform brightness level during warm-up of said projection system.

16. The apparatus of claim 13, wherein said maintenance notification alerts personnel to service said projection system and replace said lamp if necessary.

17. A retrofit automated lamp focus and brightness control assembly for spatial light modulator based projection systems, comprising:

a partial turning minor allowing a portion of the system's projected light to pass through it;

a focusing lens receiving said portion of light from said partial turning minor, said light passing through said focusing lens and reflecting off a secondary turning minor on to the surface of a light detector, wherein the output of said light detector is used to control the brightness and light distribution of a light source.

18. The apparatus of claim 17, further comprising:

a micro-controller coupled to the output of said light detector;

first, second, and third outputs from said lamp focus mechanism driving respective x, y, and z servomotors for precisely positioning said lamp;

a fourth output from said lamp brightness control circuitry driving a lamp power supply for adjusting said lamp's brightness; and a fifth output of said micro-controller providing a maintenance notification signal.

19. The apparatus of claim 18, wherein said servomotors are used to adjust said lamp position to maintain optimum real-time light distribution in said projection system.

20. The apparatus of claim 18, wherein a lamp power supply is adjusted to maintain a uniform brightness level during warm-up of said projection system.

21. The apparatus of claim 18, wherein said maintenance notification alerts personnel to service said projection system and replace said lamp if necessary.

22. An automated focus and brightness control system comprising:

a lamp providing white light along a first light path;

servos positioning said lamp;

a partial mirror on said first path, said partial mirror separating said white light into a primary beam and a secondary beam;

a spatial light modulator for producing an image using said primary beam and projecting said image to an image plane;

a detector receiving said secondary beam, said detector providing a signal indicative of a brightness and focus of said lamp;

a controller receiving said signal and controlling said servos to focus said lamp.

* * * * *